July 6, 1937.  R. W. HARROUN  2,086,328
AUTOMOBILE CLUTCH CONTROL POWER DEVICE
Filed May 7, 1934  4 Sheets—Sheet 1

Inventor
Ray W. Harroun
By Livrance and Van Antwerp
Attorneys

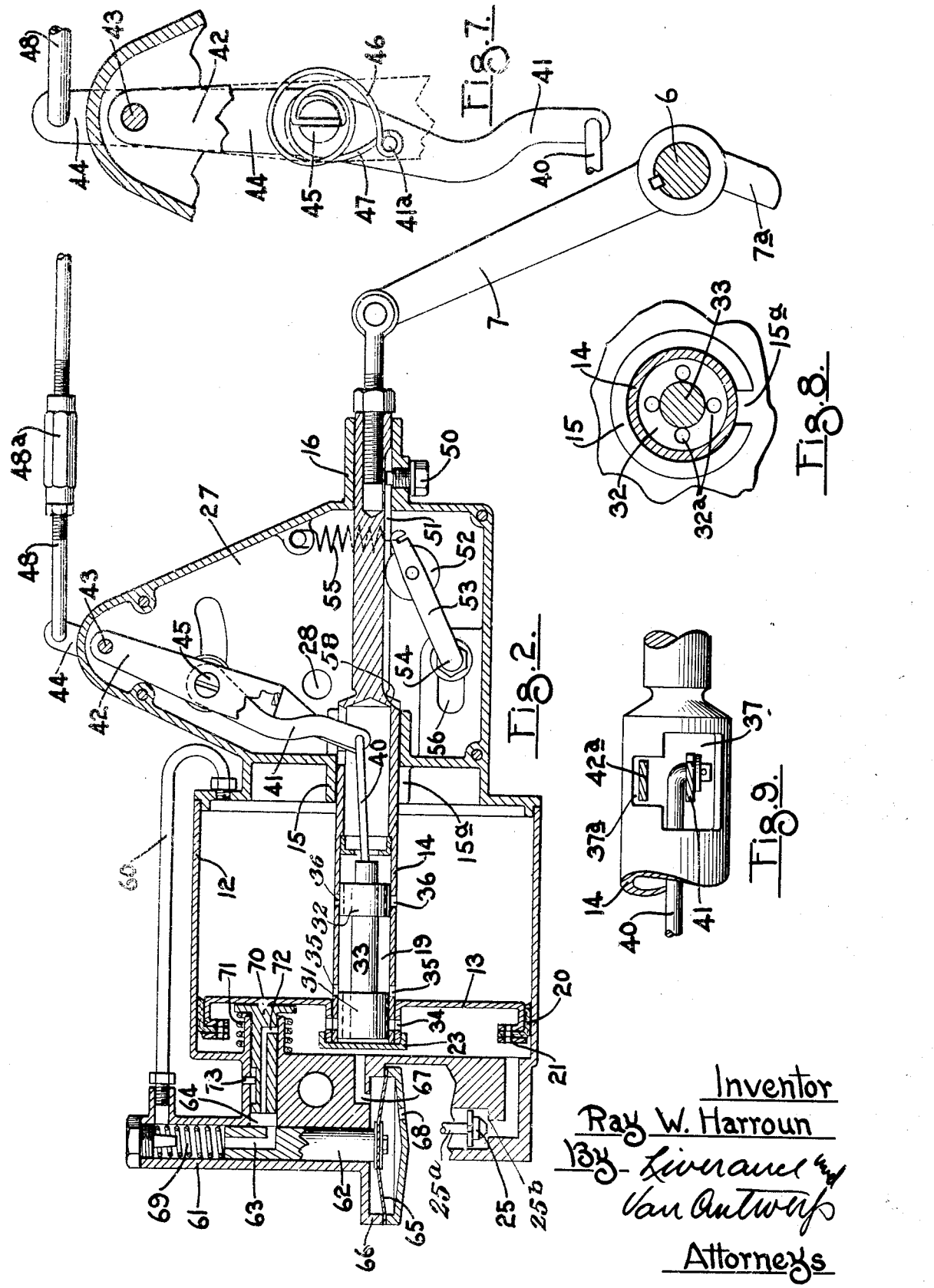

July 6, 1937.  R. W. HARROUN  2,086,328
AUTOMOBILE CLUTCH CONTROL POWER DEVICE
Filed May 7, 1934  4 Sheets-Sheet 3

Inventor
Ray W. Harroun
By Lawrence and
Van Antwerp
Attorneys

Patented July 6, 1937

2,086,328

UNITED STATES PATENT OFFICE 2,086,328

AUTOMOBILE CLUTCH CONTROL POWER DEVICE

Ray W. Harroun, Detroit, Mich., assignor to Garfield A. Wood, Detroit, Mich.

Application May 7, 1934, Serial No. 724,292

5 Claims. (Cl. 121—41)

This invention relates to a vacuum power device particularly adapted to be attached to an automobile to operate the clutch thereof and controlled by movement of the engine throttle pedal. The device derives its power from the vacuum created in the intake manifold of the internal combustion engine of the automobile and is controlled by the engine throttle pedal to disengage the clutch upon closing movement of the throttle pedal and to permit the clutch to move to engaged position upon opening movement of the throttle pedal.

The device, which includes a cylinder and piston, is in constant communication with the source of vacuum in the engine manifold, excepting when made inoperative, and is provided with control means for equalizing the vacuum at both sides of the piston to cause inoperation thereof, to admit atmospheric pressure on one side of the piston to cause its movement in one direction and to by-pass the vacuum condition from one side of the piston to the other to permit movement of the piston in the opposite direction. The piston rod of the device is connected to the clutch lever of the automobile to cause engagement or disengagement of the clutch and the control device is connected to the throttle pedal by which it is operated and controlled. Means associated with the clutch pedal are also provided by which the device can be rendered inoperative. The invention provides various new and useful features of construction and arrangement hereinafter more fully described and particularly pointed out in the claims, reference being had to the accompanying drawings, in which, Fig. 1 is a fragmentary elevation, partly in section, of an automobile engine and clutch and gear housing and the throttle control pedal showing a device embodying this invention operatively connected thereto.

Fig. 2 is an axial sectional elevation of the power device of this invention.

Fig. 7 is an enlarged fragmentary elevation, with parts broken away, of the valve control mechanism.

Fig. 8 is an enlarged cross section through the piston rod and control valve on the line 8—8 of Fig. 3.

Fig. 9 is an enlarged fragmentary plan view of a portion of the piston rod with control parts therein.

Like numerals refer to like parts in the different figures of the drawings.

Figure 1:
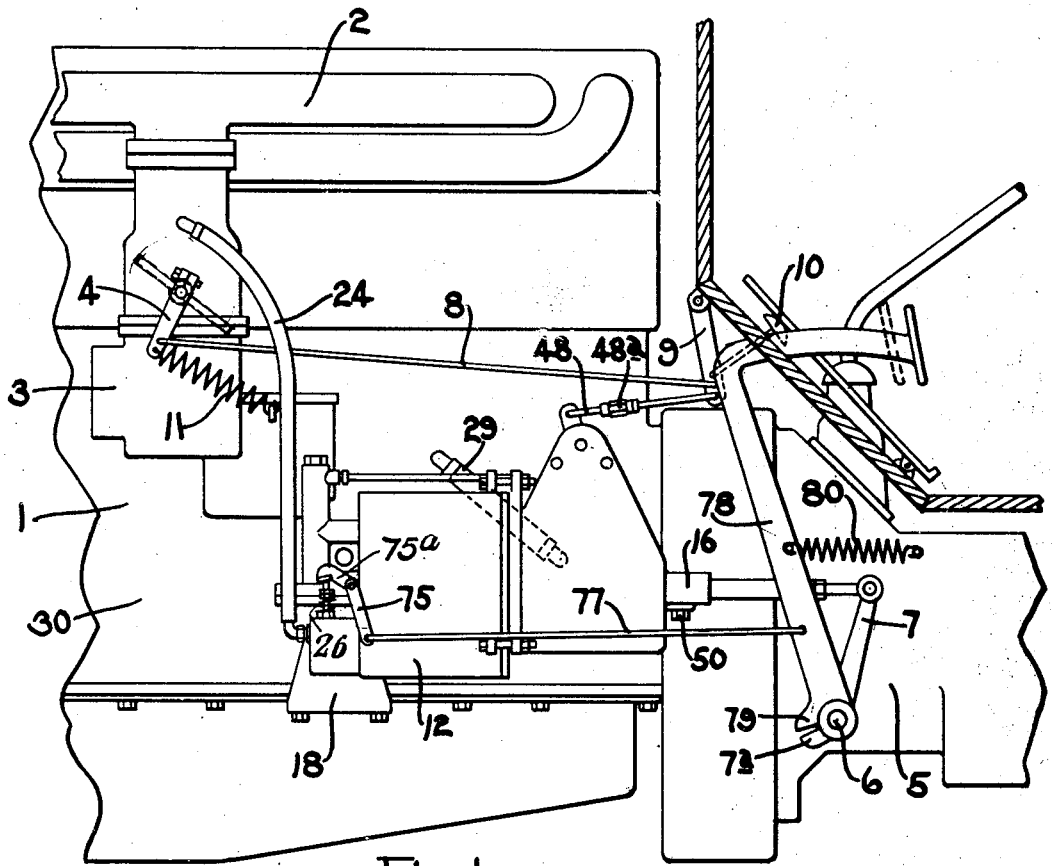
Figures 5, 6:
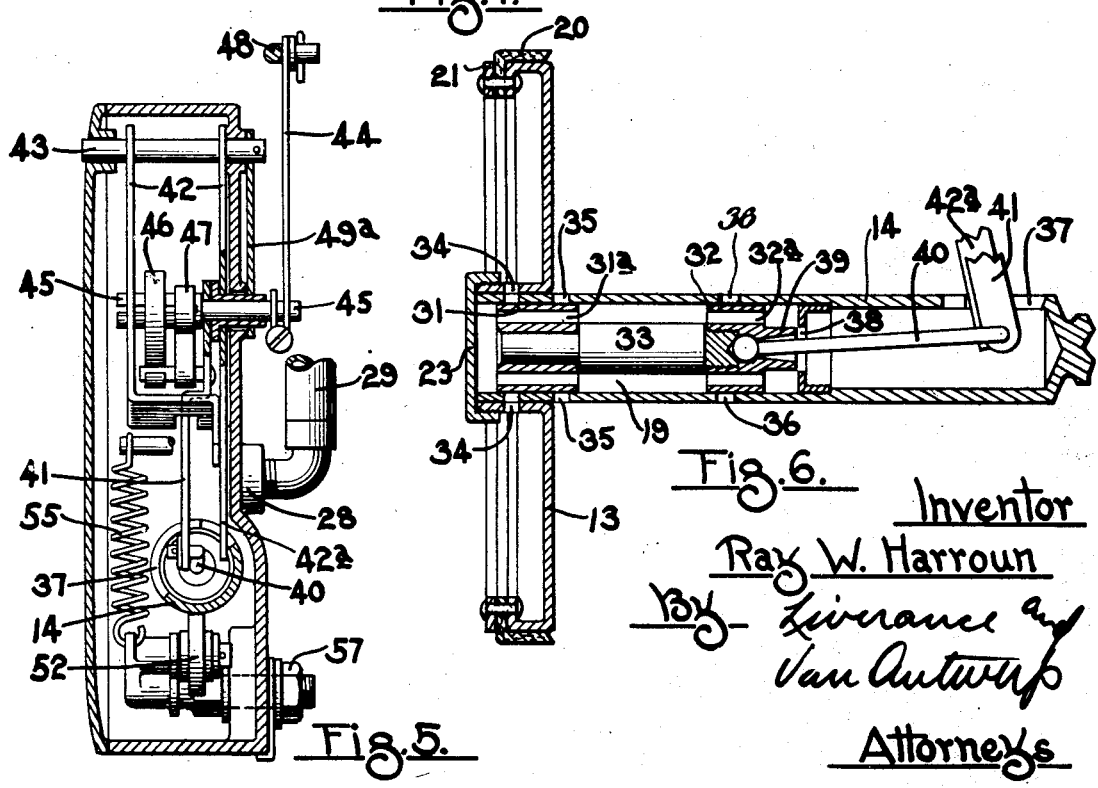
Fig. 5 is an enlarged transverse section on the line 5—5 of Fig. 4 illustrating details of the valve control mechanism.
Fig. 6 is an enlarged sectional elevation of the piston, piston rod and control valve.

The engine 1 of the automobile, which is of the internal combustion type, is provided with the customary intake manifold 2 communicating with the engine cylinders, a carburetor 3 and a throttle valve actuated by a throttle lever 4. At the rear of the engine the conventional clutch is provided within a housing 5 and the clutch is disengaged by oscillation of a shaft 6 to which a clutch lever 7 is fixed. The throttle lever 4 is connected by a rod 8 with a pivoted lever 9 to which lever the throttle pedal 10 is connected. A spring 11 yieldably moves the throttle to closed position and pressure upon the throttle pedal 10 moves the throttle to open position. The foregoing enumerated parts are conventionally used in automobile construction and their operation, arrangement and functions are well understood by those familiar with the art and therefore need no further description.

The power device of this invention has a cylinder 12 and piston 13. A piston rod 14 is attached to the piston and extends through a bearing 15 at one end of the cylinder and also has a bearing 16 in the frame of the device. The outer end of the piston rod 14 is pivotally connected to the clutch lever 7 and the closed end of the cylinder 12 is provided with a boss 17 which is pivotally attached or anchored to a bracket 18 fastened to a fixed part of the engine 1 such as the crank case. By this means the device is hung upon two pivoted mountings, the cylinder being anchored to the engine and the piston rod being connected to the clutch lever 7 whereby movement of the piston will cause movement of the clutch lever.

In detail, the inner end of the piston rod 14 is enlarged and hollow providing a valve cylinder 19 in its interior. The piston 13 preferably has a leather facing 20 which is held in place by a ring 21 and serves to prevent leakage of air between the piston and cylinder wall. A cap 23 closes the end of the valve cylinder 19 and is rigidly secured in place.

A flexible conductor, preferably a rubber hose 24, communicates with the intake manifold 2 of the engine at a point between the throttle valve and the cylinders and also communicates with the cylinder 12 through a valve 25 which valve is normally yieldably held open by a spring 26. The valve 25 has a longitudinally movable stem 25a and closes against a seat 25b. The valve 25 permits free passage of air from the cylinder to the manifold but can be closed to make the device inoperative as hereafter described. The opposite end of the cylinder is provided with a control casing 27 through which the piston rod 14 passes and this casing is open to atmospheric pressure but for the purpose of lubrication air is admitted to the casing 27 through an opening 28 which opening 28 communicates through a flexible tube 29 with the crank case 30 of the engine above the oil level therein, the interior of the crank case being under atmospheric pressure. By this means air passing through the device comes from the crank case of the engine and contains an oil mist which is distributed through the whole mechanism for lubrication.

A control valve is provided in the valve cylinder 19 in the piston rod 14 which consists of two spaced apart pistons 31 and 32 mounted upon the valve stem 33. Each of the pistons 31 and 32 has longitudinal openings 31a and 32a respectively, affording passages through it. Two sets of ports 34 and 35 are arranged adjacent the piston 31, the ports 34 opening through the piston rod 14 at one side of the piston 13 and the ports 35 opening through the piston rod at the other side of the piston. Both sets of ports 34 and 35 are arranged to be covered and closed at the same time by the piston 31 when it is in neutral position and either of said ports may be selectively opened by movement of the piston.

Ports 36 through the piston rod are provided adjacent the piston 32 and are covered by the piston when the ports 34 and 35 are covered by the piston 31. These ports 36 are arranged to be uncovered by the piston 32 when the port 34 is uncovered by the piston 31 but remain covered by the piston 32 when the piston 31 is moved to a position to uncover the port 35.

An opening 37 is provided through the piston rod through which air may enter the valve cylinder 19 and a partition, having a central opening 38, is located in the valve cylinder 19 between the opening 37 and the piston valve. A plug 39, formed on the valve stem 33, is arranged to enter and close the opening 38 when the piston valve is moved toward said opening from neutral position but when the valve is in neutral position or moved in a direction away from the opening 38 the plug 39 is out of the hole 38 and permits passage of air therethrough.

The piston valve is moved by means of a link 40 having a ball and socket connection at one end with the valve stem 33 and being pivotally connected at its other end to the valve control finger 41 which finger 41 extends through the opening 37 in the piston rod and is movable in said opening. The mechanism which moves the control finger 41 consists of a carrier lever 42, which is pivotally mounted in the control casing at its upper end at 43, and a lever 44 fixed to a rock shaft 45. The rock shaft 45 is pivotally mounted in the carrier lever 42 at a point spaced below the pivot 43 of the carrier lever and the finger 41 is rotatably mounted on the shaft 45 being actuated by oscillation of the shaft 45 through oppositely acting springs 46 and 47. The lever 44 is connected by a rod 48 with the same lever 9 which is operated by the throttle pedal 10 and which actuates the throttle valve of the engine. A turn buckle 48a is inserted in the length of the rod 48 whereby location of the lever 44 relative to location of the throttle valve lever 4 may be adjusted.

The carrier lever 42 has two spaced apart upper arms through which the pivot pin 43 passes and a lower single extension 42a which enters a slot 37a in the piston rod 14 whereby longitudinal movement of the piston rod 14 causes corresponding movement of the lower end 42a of the carrier lever and causes it to swing upon its pivot 43. The rock shaft 45 extends between, and is pivotally mounted in, the upward extensions of the carrier lever 42 and has its rear end projecting through an arcuate slot 49 in the back of the control casing 27.

The slot 49 is covered by a swinging shield 49a which prevents the entrance of air into the casing through the slot. The lever 44 is attached to the rock shaft 45 outside of the casing. The oppositely acting coiled springs 46 and 47 are attached to the rock shaft 45 and bear against opposite sides of a pin 41a which extends from the finger 41 and yieldably move the finger in either direction by oscillation of the rock shaft.

A stud screw 50 in the bearing 16 has its inner end extending into a longitudinal groove 51 provided in the piston rod 14 which prevents rotation of the piston rod and its connected parts. A roller 52 is rotatably mounted on an arm 53 pivoted at 54 in the casing 27 and a spring 55, attached to the free end of the arm 53 and to the casing, moves the roller 52 into substantial bearing engagement with the piston rod 14, for convenience the roller being mounted to traverse the groove 51. The point 54 of pivotal mounting of the arm 53 is adjustable in a direction longitudinally of the piston rod 14 in a suitable manner as by means of an elongated opening 56 in which the pivotal connection is clamped by a nut 57. The piston rod 15 is of enlarged diameter at its inner portion, that is, the portion nearest the piston, and the path of the roller 52 extends outwardly from the center of the piston rod 14 at 58 causing an extension of the spring 55 and resisting longitudinal movement of the piston rod as hereafter described.

A valved by-pass between the opposite ends of the cylinder is provided and comprises a tube 60 which communicates at one end with one end of the cylinder and at its opposite end communicates with the interior of a valve chamber 61. A sliding valve 62 is located in the chamber 61 and has a passage 63 which registers with a radially extending valve chamber 64. The lower end of the valve 62 is attached to a diaphragm 65 located in a diaphragm chamber 66 which chamber above the diaphragm communicates with the cylinder 12 by a passage 67. The lower side of the diaphragm is exposed to atmospheric pressure by means of an opening 68 through the wall of the diaphragm chamber. A spring 69 tends to move the valve 62 downwardly to stop communication between the passage 63 and the chamber 64 and suction on the upper side of the diaphragm will overcome the spring resistance and open the valve.

A shut-off valve 70 is located in the valve chamber 64 and is normally extended to open position by a spring 71 in which position a passage 72 in the valve communicates with the interior of the cylinder 12, said passage extending through the inner end of the valve 70 and communicating with the valve chamber 64. A guide pin 73 extends into a slot in the valve and limits its outward movement. This valve is moved inwardly to closed position by engagement with the piston 13 at one end of its stroke. The openings through these by-pass valves are of restricted size and will not pass sufficient fluid to satisfy the source of vacuum.

Means to render the device inoperative are provided in the nature of levers 75 and 75a which act to close the so-called block-out valve 25 against tension of the spring 26. These levers are mounted on a rock shaft 76 on the exterior of the device and a rod 77 connects them with the clutch pedal 78 of the automobile. The clutch pedal 78 is loosely mounted on the clutch shaft 6 and has an extending lug 79 which engages a corresponding lug 7a on the clutch lever 7. A spring 80 normally holds the pedal 78 in raised or return position and it will remain in this position when the automatic device operates the clutch unless it is depressed by the foot of the operator. The rod 77 and levers 75 and 75a are so arranged that when the clutch pedal is in fully raised position the lever 75a engages the stem 25a of the block-out valve 25 and closes it against the seat 25b but a slight depression of the clutch pedal moves the lever 75a sufficiently to release the valve 25 and permit it to open by action of the spring 26 and a clearance is provided between the lugs 79 and 7a so that movement of the pedal 78 sufficient to permit the block-out valve 25 to open does not cause movement of the clutch shaft 6 to disengage the clutch.

Figure 13:
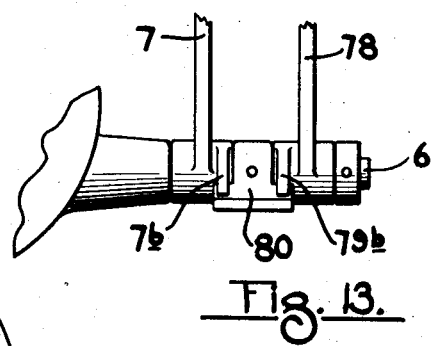
Fig. 13 is a fragmentary elevation of a modified form of clutch lever.
Figure 11:
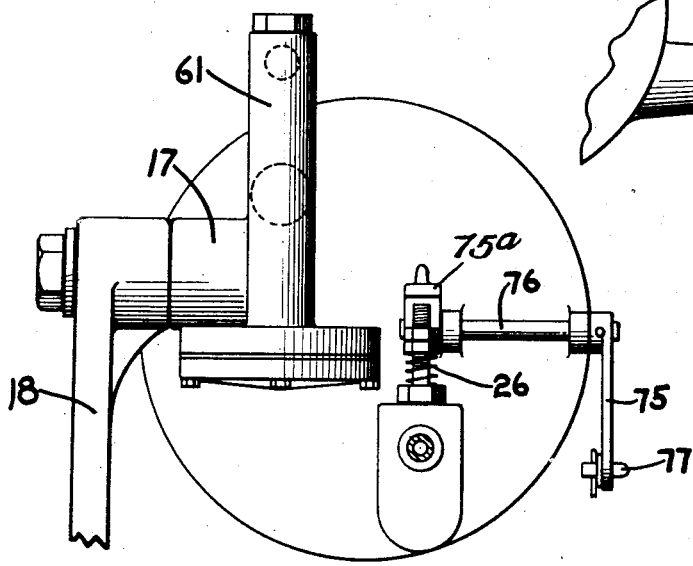
Fig. 11 is an end elevation of the device.

In case the power device becomes inoperative by defect the operator may manually operate the clutch by means of the pedal 78 and as an alternative structure which may be valuable under such conditions both the clutch lever 7 and the pedal 78 may be loosely mounted upon the clutch shaft 6 and each having a lug 7b and 79b engageable with a lug 80 fixed to the shaft 6, as shown in Fig. 13. By means of this structure either lever will rotate the clutch shaft when it is actuated but will remain idle when it is not actuated. This will eliminate the necessity of moving the piston in the cylinder when the clutch is manually operated and when the power device is inoperative.

*Operation*

The general operation of the power device, per se, will first be explained. It will be understood that this device operates to move the piston 13 in one direction only which may be called the inward direction. Opposite or outward movement of the piston is attained by outside pull on the piston rod 14 such as the effort of a clutch spring acting to engage a clutch and the piston being connected to such clutch.

Figure 4:
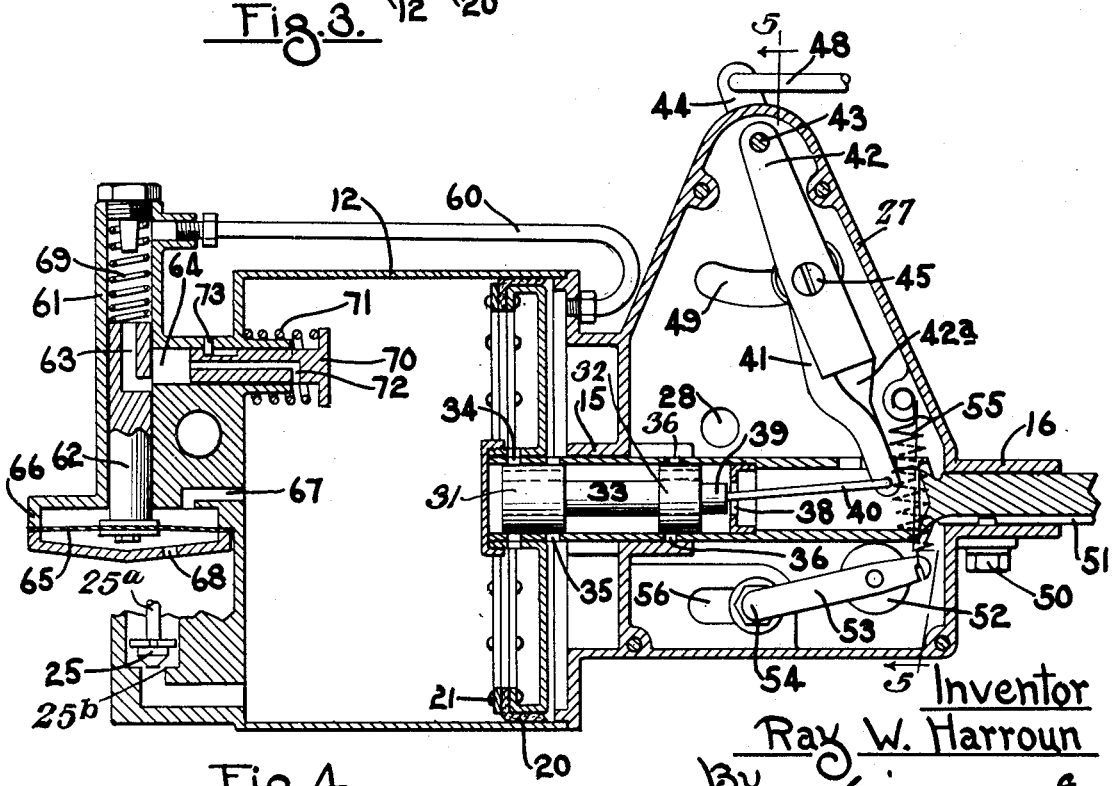
Figure 10:
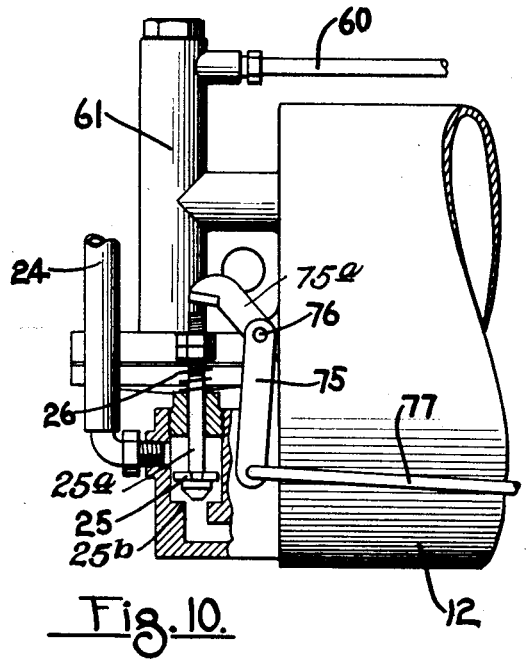
Fig. 10 is a fragmentary view, partly in section, of the inner end of the device.
Figure 12:
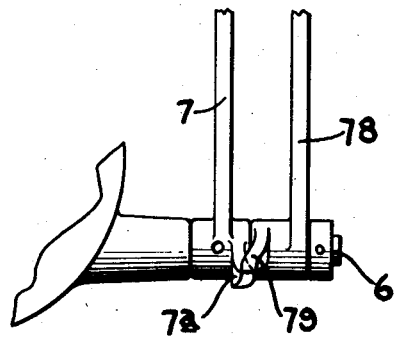
Fig. 12 is a fragmentary elevation of the clutch levers as shown in Fig. 1.

The piston 13 is at rest when the parts are in the position shown in Fig. 4 or in any intermediate position of the piston 13 providing that the piston valves 31 and 32 cover the ports 34, 35 and 36, as shown in Fig. 4. When the block-out valve 25 is open and the device is operative the inner side of the piston 13 is constantly acted upon by the vacuum which exists in the cylinder 12, the cylinder being in constant communication with a source of vacuum by the conduit 24.

Suction in the cylinder 12 and diaphragm chamber 66 holds the valve 62 raised and opens communication through the tube 60 between both ends of the cylinder. The passage through this by-pass communication is sufficient to pass any leakage of air into the outer end of the cylinder, such as may occur at the bearing 15 for example, and to maintain equal suction on both sides of the piston 13 when the valves 31 and 32 are closed thereby balancing and eliminating any effort to move it.

Movement of the piston 13 in either direction is controlled by movement of the piston valves 31 and 32 and these valves are actuated by the control finger 41 and the control lever mechanism of which it is a part. The specific control mechanism herein shown consists of a series of levers which are largely contrived for the purpose of attaining a large movement of the swinging end of the control finger 41 by means of a small movement of the lever 44.

The control finger 41 and the lever 44 are pivotally connected to each other by the shaft 45 and the oppositely acting springs 46 and 47 tend to hold these levers in a certain position relative to each other. The springs will yield to permit pivotal movement of the levers relative to each other in either direction but will constantly tend to return them to their normal relative position.

With the piston at one end of its travel as illustrated in Fig. 4, the swinging end of the lever 44 is moved toward the right which rocks the shaft 45. The movement of the lever 44 may be quickly made to its other extreme position as shown in Fig. 2 and this movement is transmitted through the opening 49 to the control finger 41 which moves the valve to the left as far as it will go in its chamber, the spring 47 yielding and remaining under tension. Following movement of the piston valves the piston 13 will be caused to move as hereafter described and movement of the piston causes swinging movement of the carrier lever 42 on which the rock shaft 45 is mounted. As the piston 13 continues its movement the carrier lever 42 continues to swing and the tension of the spring 47 continues to be exerted against the control finger 41 to hold the piston valves in their innermost positions until the piston has moved sufficiently to bring the lever 44 and control finger 41 to the same relative position in which they started whereat the oppositely acting spring 46 will counteract the effort of the spring 47 and hold the control finger 41 and piston valves against further movement.

Opposite movement of the control lever is accomplished in the same way, the various parts moving in the opposite directions until the levers have reassumed their normal rest positions in which the efforts of the springs 46 and 47 counterbalance to prevent further movement of the control finger 41. Insofar as the present invention is concerned this specific type of control lever mechanism may be regarded in its broadest sense as a yieldable means to actuate the piston valves 31 and 32 in either direction throughout the entire range of their travel.

To move the piston 13 from its rest position inwardly the piston valves 31 and 32 are moved inwardly sufficiently to uncover the port 35 while maintaining the ports 34 and 36 closed. When moved to this position air under atmospheric pressure is admitted to the outer side of cylinder 12 at the outer side of the piston 13 in greater volume than it will pass through the by-pass valves and tube 60 causing a pressure on the outer side of the piston greater than on the inner side thereof and causing the piston to move inwardly. This inward movement of the piston will continue, within its range of travel, so far as the piston valves 31 and 32 are continued to move to maintain the port 35 uncovered. When movement of the piston valve is stopped and the piston moves sufficiently to close the port 35 and prevent further passage of air therethrough the vacuous condition will again equalize on both sides of the piston through the by-pass valves and tube 60 and further movement of the piston will stop.

If the piston 13 is required to sustain a load in fixed position it will be necessary to maintain a constant vacuum on its inner side greater than the vacuum on its outer side. In such case the piston will stop when it has moved to a point where the piston valve 31 has uncovered the port 35 just sufficiently to permit entrance of air in great enough quantities to suppy the by-pass 60 and to maintain a pressure on the outer side of the piston sufficient to support the load. When the piston 13 is in its extreme inner position as shown in Fig. 2 it will engage and retract the valve 70 closing the passage 72 therein and prevent by-pass of air around the piston.

The piston 13 is permitted to move in the opposite direction or outwardly by moving the piston valves outwardly so that the plug 39 enters and closes the opening 38 stopping entrance of atmospheric pressure into the valve chamber and also uncovering the ports 34 and 36. The ports 34 and 36, being on opposite sides of the piston 13, provide a by-pass from one side to the other permitting the piston to be moved outwardly so far as the piston valves are also moved to keep the ports 34 and 36 uncovered, displacement of air from one side of the piston to the other occurring through said ports and the valve chamber. The speed of outward movement of the piston is limited only by the size of the ports 34 and 36 and the volume of air that will pass through them added to which is the passage of air through the by-pass 60.

It is desired that outward movement of the piston be cushioned or slowed near the end of its outward stroke and for that purpose the roller 52 acts in conjunction with entrance of the port 36 into the bearing 15 to retard the movement. These actions preferably occur successively in the order named but their relative occurrences may be altered by adjustment of the roller as described.

Figure 3:
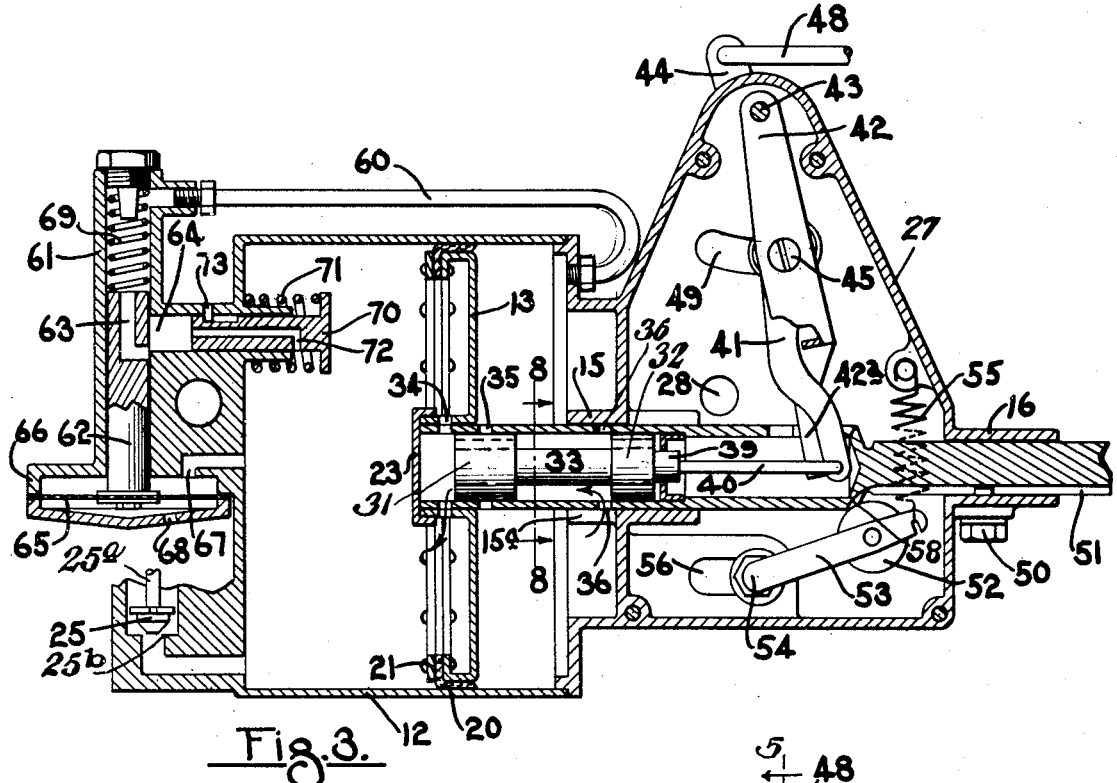
Figs. 3 and 4 illustrate the same parts of Fig. 2 in different positions of their movements.

A slot 15a is provided in the bearing 15 to register with the port 36 and when the port 36 reaches the end of the slot, as shown in Fig. 3, farther outward movement will cause it to be covered and closed by entrance into the bearing 15. From that point outward movement of the piston 13 will be controlled by passage of air through the restricted by-pass 60 and valves 62 and 70 which will cause slow movement of the piston.

In explanation of the operation of the power device to actuate the clutch of the automobile in coordination with movement of the throttle pedal it is to be assumed that the parts are mounted and associated as illustrated in Fig. 1. The action desired is to permit engagement of the clutch when the engine is accelerated and to disengage the clutch when the engine is decelerated. The clutch is provided with springs which normally hold it in engagement and which yield by movement of the clutch lever 7 to disengage the clutch. The engine throttle is normally moved to closed position by the spring 11 and is opened by depression of the accelerator pedal 10. When the engine is running at decelerated or idle speed with closed throttle and released accelerator pedal the power device actuates to move the clutch lever 7 to release the clutch. When the accelerator pedal is depressed to open the throttle and accelerate the engine speed the power device ceases its effort upon the clutch lever 7 and permits the clutch springs to engage the clutch. It is to be understood that the clutch pedal 78 must be constantly held slightly depressed to release the block-out valve 25 to render the power device operative.

Assuming that the engine is running at idle speed with the throttle in closed position and the accelerator pedal 10 released, the rods 8 and 48 will be moved to the right to their extreme positions moving the lever 44 to its extreme position to the right. This movement of the lever 44 has caused inward movement of the piston valves 31 and 32 and consequently inward movement of the piston 13 to extreme position as illustrated in Fig. 2 and has moved the clutch lever 7 to disengage the clutch. As previously explained when the valve 25 is open the inner end of the cylinder 12 is in constant communication by the conduit 24 with the vacuum created in the engine manifold 2. In order to maintain the clutch in disengaged position against action of the clutch springs the piston will move relative to the piston valve 31 to uncover the ports 35 sufficiently to permit air under atmospheric pressure to enter the outer end of the cylinder 12 and maintain a pressure therein sufficient to hold the clutch in disengagement.

Engagement of the clutch should occur simultaneously with, or immediately following, acceleration of the engine. Depression of the throttle valve pedal opens the throttle and accelerates the engine. This same movement moves the rod 48 and lever 44 to the left which moves the control finger 41 to the right and moves the piston valves 31 and 32 uncovering the ports 34 and 36 and closing the opening 38. This stops admission of atmospheric pressure to the cylinder 12 and affords a by-pass around the piston 13 permitting the piston to move in an outward direction. In the present disclosure this movement is accomplished by action of the conventional clutch springs acting to engage the clutch, which movement is transmitted through the shaft 6 and the lever 7 to the piston rod 14. This allows movement of the clutch lever 7 to engage the clutch. In this movement it is to be understood that the control levers cause the piston valves 31 and 32 to follow movement of the piston 13 until it has reached the end of its stroke.

The full movement of the lever 44 occurs in the partial initial movement of the accelerator pedal 10 so that engagement of the clutch will be caused upon slight acceleration of the engine. When the clutch has become engaged and movement of the clutch lever 7 cases the piston 13 will have no further movement and will stop either at the extreme outer end of the cylinder 12 or at a position near its outer end.

Further opening of the engine throttle may be accomplished by further depression of the accelerator pedal 10 which will also move the rod 48 and lever 44 but, since the piston 13 will move no further, this additional movement of the lever 44 merely moves the control finger 41 to the extreme movement of the piston valves 31 and 32 and stops but the lever 44 may continue to move by flexing of the springs 46 and 47.

When the valves 31 and 32 have been moved to this extreme position they open communication to the cylinder 12 on opposite sides of the piston 13 and close the entrance of atmospheric pressure. The by-pass 60 equalizes the vacuous condition on both sides of the piston.

In this outward movement of the piston to engage the clutch it is to be realized that the clutch lever 7 is customarily moved to disengaged position somewhat farther than is necessary to disengage the clutch and that in return movement to engage the clutch the lever moves a part of its movement before clutch engagement commences. Also the clutch engagement in conventional clutches is not instantaneous but occurs gradually through an appreciable movement of the clutch lever. It is desired that the first movement of the clutch lever prior to initial engagement be rapid and that this movement be slowed and gradually continued from the point of initial engagement to full engagement.

The first outward movement of the piston 13, when the valves 31 and 32 have been moved to open the ports 34 and 36, is substantially unrestricted and rapid. At the point where initial engagement of the clutch occurs the roller 52 encounters the raised portion 58 in its path on the piston rod 14 which requires extension of the spring 55 to permit farther movement of the piston rod. The effort of extending the spring 52 has the effect of reducing the speed of movement of the piston rod at the time of initial engagement of the clutch and this effort continues until the roller has mounted the enlarged portion of the piston rod 14. Either concurrently with or succeeding this action the port 36 enters the bearing 15 which closes it and further movement of the piston is slowed by the restricted passage of air through the by-pass 60 and valves 62 and 70.

At this point it must be explained that the amount or degree of vacuum produced in the manifold 2 is governed both by the extent of the throttle opening and the engine speed. Therefore, with a given throttle valve opening at clutch engagement the degree of vacuum will decrease with decreased engine speed. Now when the throttle valve is opened and before clutch engagement the engine speed will be relatively fast because it has no load and the suction will be high which will act on the diaphragm 65 to hold the valve 62 wide open. But as the clutch starts to engage and impose a load on the engine the engine speed will decrease with a corresponding decrease in suction which will permit the valve 62 to close, either partly or fully, restricting passage therethrough and further slowing movement of the piston 13.

Therefore the final engagement of the clutch is automatically controlled by the variation in speed of the engine as it picks up the load, the variation in suction caused thereby acting upon the valve 62 and controlling movement of the piston 13 in a manner to effect final complete engagement of the clutch in accordance with existing variable conditions.

Fig. 3 illustrates the parts in position during outward movement to engage the clutch and with the accelerator pedal depressed sufficiently to cause the piston valves to follow movement of the piston to the end of its stroke this outward movement will continue until the clutch is fully engaged, as above described. Movement of the piston may be stopped in mid-position by stopping movement of the piston valves in mid-position of the piston 13 whereat the piston will move sufficiently to cover all of the ports 34, 35 and 36 or to a position where the port 35 is partially uncovered to permit atmospheric pressure to enter the cylinder sufficiently to oppose the load tending to move the piston. This movement is controlled by operation of the accelerator pedal and may be used to hold the clutch in partial engagement.

Return or inward movement of the piston to disengage the clutch is accomplished when the engine is decelerated by releasing the accelerator pedal 10. In this movement the lever 44 is moved from the position shown in Fig. 4 to the right to the position shown in Fig. 2 which moves the piston valves inwardly to the left and causes them to follow movement of the piston. In this inward movement of the piston the plug 39 is removed from the opening 38, the piston valve 32 retains the ports 36 closed and the piston valve 31 retains the port 34 closed and opens the port 35. This permits passage of air under atmospheric pressure into the cylinder 12 at the outer side of the piston which pressure acting on the piston against the vacuum at the opposite side thereof causes the piston to move. Neither of the agencies described as retarding movement of the piston in the outer direction acts to retard inward movement of the piston. Action of the roller 52 by the spring 55 will have a tendency to accelerate inward movement of the piston at the location 58 but this action is immaterial.

When the block-out valve 25 is open and the automatic device is operative, the clutch is always disengaged when the accelerator is released which disconnects the engine from the driving gear of the automobile and attains a condition commonly called "free wheeling". It is often desirable, and in some places required by law, to eliminate such a free running of the automobile and to have the driving gear connected with the engine when the throttle is closed so that the resistance of the engine when decelerated may be utilized to retard movement of the automobile.

With this invention the automatic power device is only operative when the clutch pedal 78 is partly depressed to permit the block-out valve 25 to open and by entirely releasing the pedal 78 the valve 25 will close and make the power device inoperative in which condition the clutch will not be disengaged when the accelerator is released but can be disengaged either by partially depressing the pedal 78 to cause the power device to become effective or by full depression of the pedal 78 to manually release the clutch.

The invention is described in the appended claims and is to be considered comprehensive of all forms of structure coming within their scope.

I claim:

1. A fluid pressure power device comprising, a cylinder and a piston, conduit means communicating with a source of suction and in constant communication with the cylinder at one side of the piston, valve means for admitting pressure fluid to the cylinder at the opposite side of the piston, a restricted by-pass passage communicating with both ends of the cylinder at opposite sides of the piston, said passage being open to the passage of pressure fluid toward the suction end of the cylinder, means for closing said restricted by-pass passage, said piston operating the closing means at one end of its stroke and valve means for affording communication between both ends of the cylinder at opposite sides of the piston.

2. The elements in combination defined in claim 1 in which the movable elements of both of said valve means are connected to operate in unison.

3. A fluid pressure power device comprising, a cylinder and a piston, means for communicating the cylinder at one end of the piston with a source of suction, valve means for admitting fluid pressure to the cylinder at the opposite side of the piston, valve means for affording communication between both ends of the cylinder at opposite sides of the piston, a restricted by-pass between both ends of the cylinder at opposite sides of the piston and valve means in the by-pass and affected by the suction in the cylinder to control fluid passage through the by-pass.

4. The elements in combination defined in claim 3, in which said valve means in the by-pass acts to restrict the by-pass passage upon decrease of suction in the cylinder and vice versa.

5. The elements in combination defined in claim 3 combined with means for automatically closing said by-pass when the piston reaches its limit of travel toward the suction end of the cylinder.

RAY W. HARROUN.